United States Patent Office 3,282,098
Patented Nov. 1, 1966

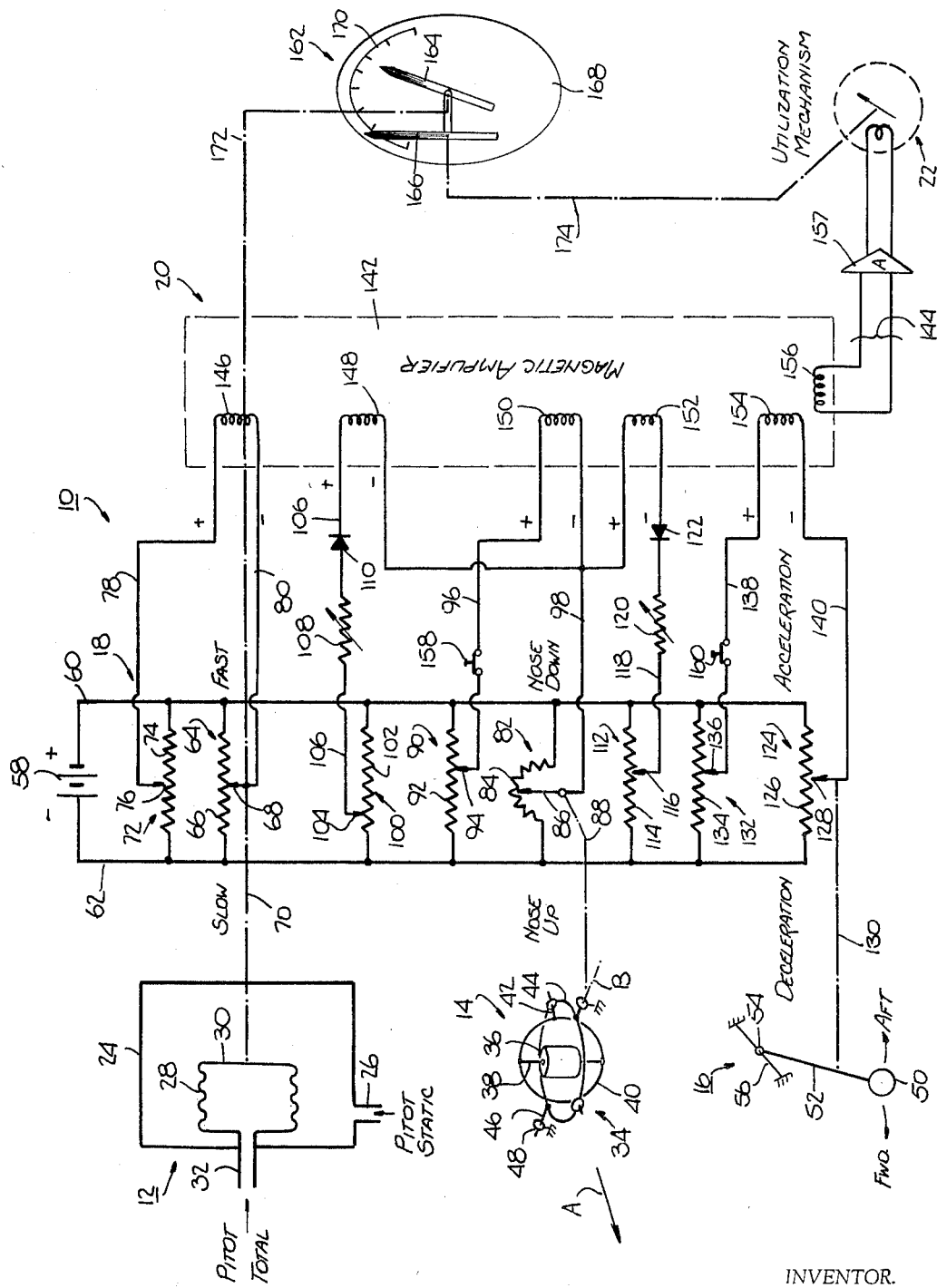

3,282,098
AIRPLANE INSTRUMENT FURNISHING A CONDITION-MODIFIED AIR SPEED DIRECTOR SIGNAL
Leonard M. Greene, Chappaqua, N.Y. (% Safe Flight Instrument Corp., 4 Water St., White Plains, N.Y.)
Filed Aug. 27, 1963, Ser. No. 304,915
12 Claims. (Cl. 73—178)

This invention relates to an airplane instrument that furnishes a condition-modified air speed director signal.

An important parameter used in controlling the operation of an airplane is air speed, to wit, the forward speed of the airplane with respect to a local air mass. A pilot frequently will rely upon the indicated air speed in manipulating the controls of an airplane. He also may vary the controls as a function of the trend of change of the indicated air speed in order to anticipate changes toward or away from a desired value of said speed. I have found that where a human or automatic pilot uses this simple, i.e. unmodified, air speed for control purposes certain difficulties arise which tend to create dangerous consequences. For example, should a following or tail wind increase rapidly it would result in a temporary reduction of indicated air speed which the pilot might try to correct by lessening the climb angle of the airplane. This would reduce the airplane's terrain clearance and could cause disaster. Moreover, if the nose-up pitch angle of the airplane is too steep, at a given air speed, the passenger comfort might be reduced too greatly, and, indeed, an unsafe condition could be reached. On the other hand, if there is an excessive nose-down pitch angle, the aircraft's speed may not be sufficient to check the high rate of descent and the airplane might be flown under unnecessarily hazardous conditions.

I have found that movement of the local air mass and excessive nose-up or nose-down pitch angles influence the air speed at which an airplane properly should be flown for safe handling. That is to say, the target air speed, this being the air speed at which the airplane will perform to best advantage, should be varied as a function of the effect upon the airplane of the movement of the local air mass, and, desirably also should be varied as a function of the pitch angle of the airplane above and below certain high and low thresholds, respectively.

It is an object of my invention to provide an airplane instrument of the character described which furnishes an output usable as a director signal, which output is a function of indicated air speed as modified by the effect of movement of the local air mass and, optionally, by the pitch of the airplane above and below certain high and low thresholds respectively.

The effect of movement of the local air mass, insofar as indicated air speed is concerned, is caused by head winds or tail winds which may be steady or simply gusts. Due to wind fluctuations, the air speed readings may not be very constant. If the wind is, for instance, a tail wind, and if the tail wind component should increase rapidly, there would be a temporary reduction of indicated air speed until the entire mass of the airplane had accelerated up to a new higher ground speed, which is the old ground speed increased by the amount of the increased tail wind component. During the period of this reduced indicated air speed the pilot, since he has seen only a reduction in air speed might attempt to restore the air speed by lessening the airplane climb angle, i.e., by reducing the pitch angle. This might be dangerous because, depending on circumstances, it could reduce the clearance of the airplane over the surrounding terrain.

Pursuant to an aspect of the present invention, I modify the indicated air speed by adding to it a signal which is a function of the forward acceleration of the airplane as measured by an inertial accelerometer, typically a vertical gyro-referenced pendulum. Inertial forward acceleration is not subject to the erratic behavior of atmospheric wind changes, since the momentum of the airplane tends to maintain its ground speed which is smooth and steady, even when turbulence in the air is causing rapid fluctuations of indicated air speed. Thus, if an aircraft has its air speed temporarily diminished because it encounters a local air mass having a tail wind component, the air speed and the trend of the air speed will indicate that the airplane is slowing down and encourage the pilot to nose down, possibly by a dangerous amount. But, while this is taking place, the inertial accelerometer would be generating a forward signal, showing a tendency to increase the indicated air speed because the tail wind component will gradually increase the ground speed of the airplane. If this inertial forward acceleration component is added to the indicated air speed, it will partially overcome the reduction in indicated air speed as furnished by the director signal. Thus, the addition of the forward inertial acceleration signal to the decaying air speed signal will diminish the pilot's tendency to pitch the airplane nose down further, as a result of the tail wind component, and thereby the danger of excessive altitude loss will be diminished. This tendency to prevent overcompensation is an extremely important consideration for take-off when the increase in a tail wind component or when a gust having a tail wind component can be encountered at altitudes very close to the ground.

Accordingly, it is a further object of my invention to provide an airplane instrument which furnishes a director signal that is a combination of indicated air speed and forward inertial acceleration.

Too steep an angle of climb or too steep a pitch angle may be objectionable for various reasons such as discomfort to the passengers or the tendency to bring about unsafe aerodynamic conditions. I have found that this can be overcome by combining with the indicated air speed a signal that is a function of the airplane pitch angle above a certain high threshold, so that if the pitch angle is too steep, the pilot will be directed to increase the air speed and he will do this at take-off by lowering the pitch angle since the engines then are at full throttle. However, should an engine fail, the airplane will reach equilibrium at a lesser pitch angle. Similar considerations affect too much of nose-down pitch angle and I have found that here too, if the pitch angle goes below a certain low threshold, it is advantageous to increase air speed, and thereby protect the aircraft by raising its speed whenever it is descending too rapidly prior to landing. Such additional speed gives the pilot the ability to check the steep rate of descent and to level off the airplane's flight path.

It is accordingly a further object of my invention to provide an airplane instrument of the character described in which there is combined with indicated air speed a signal that is a function of pitch angle above a given high threshold and below another low threshold and which signal in both instances subtracts from the indicated air speed so that it will indicate that the airplane air speed should be raised. If this signal is observed during a take-off, it will result in the pilot increasing air speed by lowering the nose of the airplane. If the signal is observed during landing approach, it will result in a pilot raising the output from the engines.

It is another object of my invention to provide an airplane instrument of the character described which is capable of furnishing a director signal that is a combination of all three signals, to wit, an indicated air speed signal, a forward inertial acceleration signal, and a signal which is a function of too great or too small a pitch angle for the airplane.

Other objects of my invention in part will be obvious and in part will be pointed out hereinafter.

My invention accordingly consists in the features of construction, combinations of elements and arrangements of parts which will be exemplified in the instrument hereinafter described and of which the scope of application will be indicated in the appended claims.

In the accompanying drawing the single schematic and circuit diagram indicates an airplane instrument embodying one of the various possible embodiments of my invention and which furnishes a condition-modified air speed director signal.

An airplane instrument according to my invention basically includes means having an output which varies as a function of indicated air speed and means to modify said output (a) as a function of forward inertial acceleration, or (b) as a function of pitch angle above and below preselected high and low pitch angle thresholds, or (c) as a function both of forward inertial acceleration and of pitch angle above or below preselected high and low pitch angle thresholds.

In its preferred form such an instrument constitutes means having an output which varies as a function of indicated air speed, means having an output which varies as a function of forward inertial acceleration, said last named means being arranged so that a positive increase in forward acceleration produces a fast output signal, i.e. one indicating an increase in air speed, means having an output which varies as a function of pitch angle above or below preselected high and low pitch angle thresholds, said last named means being arranged so that an increase of pitch angle above the high threshold and a decrease of pitch angle below the low threshold both will give a slow output signal, i.e. one indicating a decrease in airspeed and means to combine the three outputs to provide an airspeed director signal. Such preferred form of instrument can be arranged to combine only the first two outputs and, if desired, the instrument also can be arranged to combine only the first and third outputs.

The means having an output which varies as a function of indicated air speed desirably is a dynamic indicated air speed sensing means, that is to say a means which senses the forward dynamic pressure on the airplane as by sensing the total pitot pressure in a forward direction and subtracting the prevailing static pressure. The means having an output which varies as a function of forward inertial acceleration desirably is a vertical gyro-referenced pendulum, that is to say a pendulum which turns about a lateral axis and which is referenced to a vertical gyro. The referencing may be accomplished in any one of various manners, for instance by having the pendulum operate the wiper or control shaft of a potentiometer the resistance winding or frame of which is held stationary when the frame of the airplane pitches by means of a vertically spinning gyro having its pitch gimbal connected to said resistance winding or frame of the potentiometer. Alternatively the referencing may be accomplished by determining the difference between the voltage outputs from two potentiometers one of which has its control shaft connected to the pendulum and the other of which has its control shaft connected to the pitch gimbal of the vertically spinning gyro, the resistance windings or frames of both potentiometers being secured to the frame of the airplane. As a further alternative the referencing may be accomplished by having two wipers ride on a single potentiometer resistance winding that is secured to the airplane frame, one wiper being controlled by the pendulum and the other wiper being controlled by the horizontal (pitch) gimbal of the vertically spinning gyro.

In all of these arrangements the net output represents the difference between the pendulum position which is a function of both pitch angle and forward inertial acceleration and the relative position of the gyro horizontal gimbal and the airplane frame which is a function of pitch angle, such net output thereby being a function of forward inertial acceleration unmingled with pitch angle.

The means having an output which varies as a function of pitch angle above and below preselected high and low pitch angle thresholds desirably includes the vertically spinning gyro and, more particularly, the relative position of the horizontal gimbal thereof to the inclination of the fore and aft axis of the airplane frame. The preselected high and low thresholds can be set mechanically or electrically, an electric setting being preferred for its simplicity, economy, ease of installation and ease of incorporation into the instrument.

The means for combining the various outputs can either be mechanical or electrical in nature depending upon the outputs. For example, differential transmissions can be used when the outputs are mechanical and summing means such as plural input magnetic amplifiers or Wheatstone bridges can be used when the outputs are electrical. I prefer to employ electrical outputs for the sundry means since these are easier to handle and adjust and, accordingly, each of the means having an output desirably includes a transducer to change a mechanical positional output into an electrical output.

Referring now in detail to the drawings, the reference numeral 10 denotes an airplane instrument constructed in accordance with my present invention. The line of flight of the airplane in which the instrument is carried is indicated by the reference character A. This is the line of flight of the airplane with respect to its local air mass.

The instrument includes an air speed sensing means 12, a pitch angle sensing means 14 in the form of a vertically spinning gyro and a forward inertial acceleration sensing means 16 in the form of a pendulum which senses both forward inertial acceleration and pitch angle. The outputs of these three means are mechanical. The instrument further includes a set of transducers 18 for converting the sundry mechanical outputs into electrical outputs. Finally, the instrument includes a summing means 20, i.e. a combining means, for adding the several electrical outputs, the summing means feeding its output to a utilization mechanism 22.

The air speed sensing means 12 is, as indicated earlier, of the dynamic pressure type. It includes a case 24 provided with a single opening 26 that connects the interior of the case to the air within the fuselage of the airplane so that the pressure of the air within the case is the static pressure prevailing in the region of the airplane. Also located within the case is a corrugated bellows 28 having a wall 30 which is shiftable as a function of the difference in pressures between the interior of the bellows and the interior of the case 24. A conduit 32 extends from the bellows through a wall of the case to which it is tightly sealed to a forwardly facing Pitot tube external to the airplane and sufficiently far from the airplane wing, propellers, jet engines and fuselage structure to be materially affected by turbulence created by the airplane. Thereby the air pressure within the bellows is the total Pitot pressure including the static pressure that is a function of altitude and air conditions and the dynamic pressure that is a function of indicated air speed. Hence the wall 30 of the bellows will experience movement which is a function of dynamic air pressure and, therefore, a function of indicated air speed.

The pitch angle sensing means 14 constitutes a vertically spinning gyro 34 which has a spinning weight 36 secured to a vertical weight shaft 38. The ends of the weight shaft are journaled in bearings in a vertical gimbal ring 40 that lies in a vertical plane parallel to the fore and aft axis of the airplane and generally parallel to the line of flight A. The gimbal ring 40 is provided with trunnions 42 journaled to turn on a roll axis parallel to the line of flight A in bearings carried by a horizontal (pitch) gimbal ring 44, the trunnions and bearings being located in a fore and aft line in the plane of the gimbal ring 40. The horizontal gimbal ring 44 is journaled by horizontal trunnions 46, that constitute the pitch axis B, on a structural member of the airplane, for example, bearings 48 fixed to the airplane frame. The pitch axis B is at right angles to the line of flight A and to the roll axis.

The spinnig weight 36 is rotated at high speed by any suitable means, e.g. an air motor or an electric motor of conventional construction.

As is well known in an arrangement of this character the horizontal gimbal ring 44 and the trunnions 46 constituting the pitch axis B will remain fixed within the airplane with said gimbal ring horizontal when the airplane experiences pitching movement, i.e., changes its pitch angle. Thus, when the airplane rotates in space so as to raise or lower the angle of its nose the horizontal gimbal ring 44 will not experience a corersponding angular movement about the pitch axis B but will remain fixed in a plane parallel to the ground. Thus, the angular relationship between the horizontal gimbal ring 44 and the frame of the airplane will vary as a function of the pitch angle of the airplane.

The forward inertial acceleration sensing means is in the form of a pendulum bob 50 secured to an arm 52 that is journaled at 54 to a shaft 56 which is fast on the airplane frame. Said shaft and journal are so disposed that the pendulum bob swings about a lateral axis, this being an axis perpendicular to the line of flight A and horizontal when the airplane is horizontal. The angular position of the pendulum bob with respect to the airplane frame varies as a function of forward inertial acceleration and pitch angle and the difference between such angular position of the bob and the relative angular position between the horizontal gimbal ring 44 and the airplane frame is a function of forward inertial acceleration unmingled with pitch angle.

The transducers 18 are energized from a source of electric power such as a battery 58 through a pair of buses 60, 62, the bus 60 being shown as positive and the bus 62 being shown as negative.

The transducer for the air speed sensing means includes a potentiometer 64 having a resistance winding 66 and a wiper 68. The winding 66 is fast to the frame of the airplane and has its opposite ends connected to the buses 60, 62. The wiper 68 is connected by a mechanical link 70 to the bellows wall 30 so that its position on the resistance winding and, therefore, the value of the voltage picked off by it will be a function of dynamic indicated air speed.

Although it is within the scope of my invention to feed such an electrical output which is a function of the numerical value of the dynamic indicated air speed into the summing means 20 I prefer to employ an output which is an indication of a null reading, this being the difference between the indicated air speed and a preselected air speed so that the net output from the transducer for the air speed sensing means is an output indicative of the deviation of the dynamic indicated air speed from a preselected air speed. This has the advantage of enabling the pilot, human or mechanical, to observe as an air speed director signal an indication that the air speed is above or below a preselected null.

In order to derive such a null signal I provide a null potentiometer 72 for the air speed sensing means. The null potentiometer includes a resistance winding 74 and a wiper 76. The resistance winding is fast to the frame of the airplane and is connected across the buses 60, 62. The wiper 76 is adjusted manually to any selected air speed, whereby the difference between the voltage pick offs from the the two potentiometers 64, 72 is a null output which is a function of the deviation of indicated air speed from a preselected air speed.

As indicated by legends in the figure the null air speed output will be more positive on the wiper 68 than on the wiper 76 when the measured dynamic air speed is faster than the preselected air speed and will be more negative when the measured dynamic air speed is slower than the preselected air speed. Phrased differently, a more negative output on the wiper 68 than on the wiper 76 is an indication that the airplane's air speed is too slow with reference to a preselected null air speed. The output from said air speed null transducer appears across lead wires 78, 80 connected, respectively, to the wipers 76, 68.

The transducer for the pitch angle sensing means 14 includes a potentiometer 82 having a resistance winding 84 and a wiper 86. The winding 84 is fast to the frame of the airplane and has its opposite ends connected to the buses 60, 62. The wiper 86 is connected by an arm 88 to the horizontal (pitch) gimbal ring 44 of the vertically spinning gyro 34 so that its position on the resistance winding and, therefore, the value of the voltage picked off by it will be a function of the pitch angle of the airplane. Although it is within the scope of my invention to feed such an electrical output which is a function of the numerical value of the pitch angle into the summing means, I prefer to employ an output which is an indication of a null reading this being the difference between the pitch angle and a preselected pitch angle so that the net output from the pitch angle transducer is an output indicative of the deviation of the pitch angle from a preselected pitch angle (which may be zero), thus obtaining the advantage of an indication that the actual pitch angle is above or below the selected angle.

To derive such a null pitch angle signal I provide a null pitch angle potentiometer 90. This potentiometer includes a resistance winding 92 and a wiper 94. The resistance winding is fast to the frame of the airplane and is connected across the buses 60, 62. The wiper 94 is adjusted manually to any selected pitch angle whereby the difference between the voltage pick offs of the two potentiometers 82, 90 is a null pitch angle output which is a function of the difference between the actual pitch angle and a preselected pitch angle.

As indicated by legends in the figure, the null pitch angle output will be more positive on the wiper 86 than on the wiper 94 when the pitch angle is below the null pitch angle, i.e. the null pitch angle signal on the wiper 86 becomes more relatively positive as the airplane noses down. Contrariwise the signal on the wiper 86 will be more negative than on the wiper 94 when the airplane noses up above the preselected null pitch angle. Thus, when the wiper 86 is negative with respect to the wiper 94, it is equivalent to an indication that the air speed is too slow, since this corresponds to a like indication furnished by the wipers 68, 76.

The output from the pitch angle transducer appears across lead wires 96, 98 connected, respectively, to the wipers 94, 86.

Associated with the pitch angle transducer are electrical threshold means that provide output signals when the pitch angle of the airplane exceeds a preselected high pitch angle threshold or falls below a preselected low pitch angle threshold.

The high pitch angle threshold transducer includes a potentiometer 100 having a resistance winding 102 fixed to the frame of the airplane and connected across the buses 60, 62. A wiper 104 slides under manual control on the resistance winding 102 and is connected to a lead wire 106. Series inserted in the lead wire are an amplitude controlling variable resistor 108 and a blocking diode 110. The voltage pick off from the high pitch angle threshold potentiometer 100 is, as soon will be seen, compared with the voltage pick off from the pitch angle potentiometer 82. The blocking diode 110 is oriented to pass current only when the wiper 104 is positive with respect to the wiper 86. This occurs only at such times as the pitch angle, as measured by the position of the gyro controlled wiper 86, is higher (more nose up) than the pitch angle threshold as determined by the manually set position of the wiper 104. In other words, if while flying the airplane the vertically spinning gyro causes the wiper 86 to become more negative than the wiper 104, the diode 110 will pass current at a voltage level which is a function of the amount the pitch angle of the airplane exceeds the preselected pitch angle setting of the wiper 104. It will be observed the output from this high pitch angle threshold transducer which is responsive to the amount the pitch angle exceeds the high pitch angle threshold provides a signal equivalent to a slow air speed signal, that is, it will tend to indicate that the air speed is too slow and will encourage the pilot or cause the autopilot to increase the indicated air speed.

The low pitch angle threshold transducer includes a potentiometer 112 having a resistance winding 114 fixed to the frame of the airplane and connected across the buses 60, 62. A wiper 116 slides under manual control on the resistance winding 114 and is connected to a lead wire 118. Series inserted in the lead wire are an amplitude controlling variable resistor 120 and a blocking diode 122. The voltage pick off from the low pitch angle threshold potentiometer 112 is, as soon will be seen, compared with the voltage pick off from the pitch angle potentiometer 82. The blocking diode 122 is oriented to pass current only when the wiper 116 is negative with respect to the wiper 86. This occurs only at such times as the pitch angle, as measured by the position of the gyro controlled wiper 86, is lower (more nose down) than the pitch angle threshold as determined by the manually set position of the wiper 116. In other words, if while flying the airplane the vertically spinning gyro causes the wiper 86 to become more positive than the wiper 116 the diode 122 will pass current at a voltage level that is a function of the amount the pitch angle of the airplane is less than the preselected pitch angle setting of the wiper 116. It will be observed that the output from this low pitch angle threshold transducer which is responsive to the amount the pitch angle is less than the low pitch angle threshold provides a signal equivalent to a slow air speed signal, that is, it will tend to indicate that the air speed is too slow and will encourage the pilot or cause the autopilot to increase the indicated air speed.

The transducer for the forward inertial acceleration sensing means 16 includes a potentiometer 124 having a resistance winding 126 and a wiper 128. The winding 126 is fast to the frame of the airplane and is connected across the buses 60, 62. The wiper 128 is connected by a mechanical link 130 to the arm 52 of the pendulum bob 50 so that the position of said wiper on the resistance winding, and, therefore, the value of the voltage picked off by it will be a function of the position of the bob 50. The position of the bob is controlled by two variables. One of these is forward inertial acceleration (positive or negative) and the other is pitch angle. Hence the value of the voltage picked off by the wiper 128 is a function of both forward inertial acceleration and pitch angle.

As will be pointed out shortly, the pitch angle component of the output from the potentiometer 124 is opposed by the pitch angle output from the pitch angle potentiometer 82 so that the only net effect of variation in the positions of these two potentiometers will be the result of the forward inertial acceleration, if any. The pitch angle signals from the pitch angle potentiometer and from the forward inertial acceleration potentiometer are opposed and preferably of equal magnitude for any selected value of pitch angle.

As in the case of the other transducers the forward inertial acceleration transducer is connected to provide a null indication and for this purpose I provide a null potentiometer 132 associated with the potentiometer 124. The null potentiometer includes a resistance winding 134 and a wiper 136. The resistance winding is fast to the frame of the airplane and is connected across the buses 60, 62. The wiper 136 is manually adjusted to any selected position whereby the difference between the voltage pick offs of the two potentiometers 124, 132 is a null output which is a function of the difference between the null setting of the wiper 136 and the prevailing pitch angle and forward inertial acceleration setting of the wiper 128.

As indicated by the legends in the figure, the null output from the two potentiometers 124, 132 will be more positive on the wiper 128, than on the wiper 136 when the combined pitch angle and acceleration position of the bob 50 exceeds the setting of the wiper 136. As a practical matter, due to the cancellation of the pitch angle component of the wiper 128 the signal on the wiper 128 will be more positive than that on the wiper 136 when the acceleration prevailing in the airplane exceeds the null acceleration setting of the wiper 136 and will be more negative when the acceleration is less than the acceleration setting of the wiper 136. Desirably, the acceleration setting of the wiper 136 is such that when the airplane is at any pitch angle between the high and low pitch angle thresholds and is experiencing no forward acceleration, the potential on both wipers 128 and 136 is the same. Thereby the wiper 128 will be negative with respect to the wiper 136 when the airplane is decelerated and will be positive with respect to the wiper 136 when the airplane is accelerated.

The output from the forward inertial acceleration transducer appears across lead wires 138, 140 connected, respectively, to the wipers 136, 128.

The summing means 20 is of any electrical arrangement which will add the various outputs from the transducers. A convenient means is a reset magnetic amplifier 142. Such an amplifier is conventional per set. Typical amplifiers of this type are the Ferrac Magnetic Amplifiers manufactured by Airpax Electronics, Inc., Seminole Division, of Fort Lauderdale, Florida. This type of amplifier includes a plurality of control inputs and a polar output 144. A highly simplified internal diagram for the amplifier has been schematically indicated for ease in following the explanation of the operation of the instrument 10. Thus, said amplifier has five input control windings 146, 148, 150, 152, and 154.

The input control winding 146 is connected across the lead wires 78, 80 and hence provides a control input which is a function of the deviation of the dynamic indicated air speed from the preselected manual null air speed setting of the wiper 76.

The input control winding 148 is connected across the lead wires 98, 106 and hence will provide a control input which is a function of the amount the pitch angle exceeds the preselected high pitch angle threshold. The diode 110 blocks the feeding of any signal to the input control winding 148 until the pitch angle of the airplane, as determined by the gyro 34, exceeds the preselected manual pitch angle setting of the wiper 104.

The input control winding 150 is connected across the lead wires 96, 98 and hence provides a control input which is a function of the deviation of the pitch angle from the preselected manual null pitch angle setting of the wiper 94.

The input control winding 152 is connected across the lead wires 98, 118 and hence will provide a control input which is a function of the amount the pitch angle is less than the preselected low pitch angle threshold. Above this low pitch angle threshold the diode 122 blocks any signal to the winding 152.

The input control winding 154 is connected across the lead wires 138, 140 and hence provides a control input which is a function of the deviation of the pitch angle and forward inertial acceleration from the preselected null setting of the wiper 128.

The amplifier 142 further includes an output winding 156 that feeds the polar output 144. The output developed on the winding 156 is a function of the sum of all the signals (positive and negative) fed into the input control windings 146, 148, 150, 152 and 154.

It will be observed that the air speed sensing transducer is so connected that at a dynamic indicated air speed which is slower than the null air speed as determined by the setting of the wiper 76 a positive signal appears on the lead wire 78 and a negative signal on the lead wire 80. These values have been indicated by plus and minus symbols at the terminals to the input control winding 146. Phrased differently when the potentials applied to the control winding 146 are as indicated by said symbols it is an indication that the airplane's air speed is too slow. If this were the only signal being fed into the summing means 20 the signal appearing at the polar output 144 would indicate that the airplane's air speed is too slow.

The connections from the pitch angle transducer to the control winding 150 are such that when the pitch angle of the airplane decreases below the setting of the wiper 94 the signal supplied to the summing means is such as to indicate that the airplane's air speed is too slow.

The connections of both the high and low pitch angle transducers to their corresponding input control windings 148 and 152 are such that when the pitch angle of the airplane is above the high threshold setting or below the low threshold setting the signal supplied to the summing means indicates that the airplane's air speed is too slow.

The connections from the forward inertial acceleration transducer to the input control winding 154 are such that upon forward inertial deceleration, pitch angle for the moment being disregarded, the signal will indicate that the air speed is too slow.

To summarize as to the connections to the sundry input control windings, the plus and minus symbols at the terminals of said windings show the polarity of the inputs toward producing a slow output signal.

Attention is called to the fact that the pitch angle signal supplied to the pitch angle input control winding 150 is opposite to the pitch angle signal fed to the forward inertial acceleration input control winding 154 so that both of these signals oppose one another in the amplifier and cancel out for any prevailing pitch angle. It is for this reason that the bob 50 through its transducer supplies a signal to the input control winding 154 which is a function of forward inertial acceleration independent of pitch angle.

The polar output 144 is connected through an amplifier 157 to the utilization mechanism 22 which may be a null meter or an input control terminal for an autopilot. The autopilot may be arranged, for example, to either increase the pitch angle of the airplane or reduce the throttle setting when the combined output 144 indicates that the airplane's air speed is too slow.

The operation of the instrument is believed to be obvious. The output signal 144 fed to the utilization mechanism indicates that the airplane's air speed is too fast when such speed is above the null value and too slow when such speed is below the null value assuming all of the other inputs are zero.

When the pitch angle varies and there is no positive or negative forward acceleration the signal applied to the winding 150 is opposite to and cancels the signal applied to the winding 154 so that the pitch angle will have no net effect on the summing means so far as the forward inertial acceleration sensing means is concerned. However, when the pitch angle is above the high threshold or below the low threshold the air speed signal will be modified so that the output 144 will show a slow air speed condition, assuming that the true indicated air speed is equal to the null set air speed. Under any other circumstances it will simply reduce the output indicated air speed director signal fed to the utilization mechanism.

When the airplane experiences positive forward inertial acceleration the indicated air speed output will be reduced. Thus, when the airplane is positively accelerated the air speed director signal at the output is increased above the actual null indicated air speed speed as measured by the air speed sensing means.

Accordingly, the instrument 10 will provide an air speed director signal which when the airplane first encounters a tail wind indicates that the air speed has been reduced, but not by the actual amount of the reduction because at the same time that the true indicated air speed has been reduced the airplane will be subjected to forward acceleration which is translated in the summing means into an apparent increase in indicated air speed. Similarly for excessive nose up or nose down conditions the high or low pitch angle transducers will modify the output air speed director signal to indicate an air speed which is less than the air speed actually being experienced. In all of these instances therefore the pilot will take corrective action which is proper and not objectionable.

If the instrument 10 is to be operated so as to modify the indicated air speed output only as a function of forward inertial acceleration (positive and negative) and not as an additional function of pitch angle above or below preselected high and low pitch angle thresholds, it merely is necessary to slide the wiper 104 all the way to the negative bus 62 and the wiper 116 all the way to the positive bus 60. This prevents the feeding of any inputs to the control windings 148, 152.

If the instrument 10 is to be operated so as to modify the indicated air speed output only as a function of pitch angle above or below preselected high and low pitch angle thresholds and not as an additional function of forward inertial acceleration, it merely is necessary to open hand switches 158, 160 in the lead wires 96, 138. This prevents the feeding of any inputs to the control windings 150, 154.

If the instrument 10 is to be operated so as to modify the indicated air speed output only as a function of pitch angle exclusive of threshold values and of forward inertial acceleration, it merely is necessary to slide the wiper 104 all the way to the negative bus 62 and the wiper 116 all the way to the positive bus 60 and to open the hand switch 160. This prevents the feeding of any inputs to the control windings 148, 152 and 154.

Each of these alternative operations furnishes a director signal at the output 144 which is useful in a different manner for the control of an airplane.

I have found the instrument 10 to be particularly useful where the ouput air speed director signal is so physically displayed as to be directly comparable with a display of air speed signal, as by having two pointers that are responsive to such signals move over a common scaled dial. Such arrangement has been illustrated in the figure where the reference numeral 162 denotes a comparison meter having two needle pointers 164, 166 mounted to turn around a common axis over a dial 168 having air speed graduations 170. The needle pointer 164 is driven through a mechanical link 172 by the wall 30 of the bellows 28 so that this pointer reads against the graduations 170 as a sole measure of air speed. The needle pointer 166 is driven through a mechanical link 174 by the utilization mechanism 22 so that it reads against said graduations 170 as a measure of indicated air speed modified by forward inertial acceleration and/or pitch angle. Preferably in the specific comparison arrangement the modification of air speed is solely by forward inertial acceleration and, therefore, the potentiometers 100, 112 are adjusted as described above to prevent the feeding of any inputs to the control windings 148, 152. The instrument as thus described furnishes an indication of both the unmodified air speed and the modified air speed (modified solely by forward inertial acceleration), the indications being given in close physcal proximity to one another so that the pilot has no trouble in ascertaining when the unmodified air speed equals the modified air speed. Of course, when these two readings are the same, forward inertial acceleration is substantially equal to zero.

It thus will be seen that I have provided an instrument which achieves the several objects of my invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and desire to secure by Letters Patent:

1. An airplane instrument comprising means having an output which varies as a function of the dynamic indicated air speed of an airplane, means having an output which varies as a function of the forward inertial acceleration of the airplane, means having an output which varies as a function of pitch angle above or below preselected high and low pitch angle thresholds, and means combining said outputs to provide an air speed director signal that increases with increase in dynamic indicated air speed, that increases with positive forward inertial acceleration of the airplane and that decreases with an increase of pitch angle above the high pitch angle threshold and with a decrease of pitch angle below the low pitch angle threshold.

2. An airplane instrument as set forth in claim 1 wherein all of said outputs are electrical and wherein the combining means is electrical.

3. An airplane instrument as set forth in claim 1 which further includes a utilization mechanism controlled by the director signal.

4. An airplane instrument as set forth in claim 3 in which the utilization mechanism is a meter.

5. An airplane instrument as set forth in claim 3 wherein the utilization mechanism is an automatic pilot.

6. An airplane instrument as set forth in claim 1 wherein all of the outputs are null outputs and wherein the combining means provides a null air speed director signal.

7. An airplane instrument comprising means having an output which varies as a function of the dynamic indicated air speed of an airplane, gyro-referenced means having an output which varies as a function of the forward inertial acceleration of the airplane, means having an output which varies as a function of pitch angle above or below preselected high and low pitch angle thresholds, and means combining said outputs to provide an air speed director signal that increases with increase in dynamic indicated air speed, that increases with positive forward inertial acceleration of the airplane and that decreases with an increase of pitch angle above the high pitch angle threshold and with a decrease of pitch angle below the low pitch angle threshold.

8. An airplane instrument comprising means having an output which varies as a function of the dynamic indicated air speed of an airplane, a horizontally stabilized pendulum means having an output which varies as a function of the forward inertial acceleration of the airplane, means having an output which varies as a function of pitch angle above or below preselected high and low pitch angle thresholds, and means combining said outputs to provide an air speed director signal that increases with the increase in dynamic indicated air speed, that increases with positive forward inertial acceleration of the airplane and that decreases with an increase of pitch angle above the high pitch angle threshold and with a decrease of pitch angle below the low pitch angle threshold.

9. An airplane instrument comprising means having an output which varies as a function of the dynamic indicated air speed of an airplane, a gyroscope having a horizontally stabilized member which controls an output that varies as a function of the pitch angle of the airplane, a pendulum mounted for rotation about a lateral axis and controlling an output that varies as a function of the forward acceleration of the airplane, and means combining said outputs with the pitch angle output of the gyro opposing the pitch angle output of the pendulum so that the net output of the gyro and pendulum is an output that varies as a function of the forward inertial acceleration of the airplane and so that the total output of the combining means is an air speed director signal that increases with increase in dynamic indicated air speed and that increases with positive forward inertial acceleration of the airplane, the instrument further including a manually settable high threshold pitch angle means having an output and a manually settable low threshold pitch angle means having an output, and means comparing the outputs of said threshold means with the pitch angle output of the gyro so as to provide two further outputs when the pitch angle of the airplane exceeds the high pitch angle threshold and is less than the low pitch angle threshold, said two further outputs being fed to the combining means to decrease the air speed director signal with increase of pitch angle above the high pitch angle threshold and with decrease of pitch angle below the low pitch angle threshold.

10. An airplane instrument as set forth in claim 9 wherein the outputs of the threshold means are electrical and wherein the threshold means include diodes to block the two further outputs when the pitch angle of the airplane is between the high pitch angle threshold and the low pitch angle threshold.

11. An airplane instrument comprising a comparison reading device including two reading means, a common scale with which said reading means are operatively associated, means sensitive to the air speed of an airplane, means connecting said air speed sensing means to one of said reading means, means sensitive to the forward inertial acceleration of an airplane, combining means responsive to the air speed sensing means and to the forward inertial acceleration sensing means to modify the air speed as a function of forward inertial acceleration and means connecting said combining means to the other reading means whereby in the absence of forward inertial acceleration the two reading means will be at like positions with respect to the common scale.

12. An airplane instrument comprising means having an output which varies as a function of the dynamic indicated air speed of an airplane, means having an output which varies as a function of the forward inertial acceleration of the airplane, means having an output which varies as a function of pitch angle beyond a preselected pitch angle threshold, and means combining said outputs to provide an air speed director signal that increases with increase in dynamic indicated air speed, that increases with positive forward inertial acceleration of the airplane and that decreases with a change of pitch angle beyond said preselected pitch angle threshold.

References Cited by the Examiner

UNITED STATES PATENTS

| | | | |
|---|---|---|---|
| 2,948,496 | 8/1960 | Joline | 244—77 |
| 3,043,540 | 7/1962 | Greene | 244—77 |
| 3,112,905 | 12/1963 | Greene | 244—77 |

LOUIS R. PRINCE, *Primary Examiner.*

DONALD O. WOODIEL, *Assistant Examiner.*